United States Patent
Kim et al.

(10) Patent No.: US 12,307,271 B2
(45) Date of Patent: May 20, 2025

(54) ELECTRONIC DEVICE AND MULTI-WINDOW CONTROL METHOD OF ELECTRONIC DEVICE

(71) Applicant: SAMSUNG ELECTRONICS CO., LTD., Suwon-si (KR)

(72) Inventors: Byoungkug Kim, Suwon-si (KR); Changho Lee, Suwon-si (KR); Kwangtaek Woo, Suwon-si (KR); Deukkyu Oh, Suwon-si (KR); Jinwan An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/198,631

(22) Filed: May 17, 2023

(65) Prior Publication Data

US 2023/0289200 A1 Sep. 14, 2023

Related U.S. Application Data

(63) Continuation of application No. PCT/KR2021/015802, filed on Nov. 3, 2021.

(30) Foreign Application Priority Data

Nov. 17, 2020 (KR) .................. 10-2020-0153918

(51) Int. Cl.
*G06F 3/0481* (2022.01)
*G06F 3/0484* (2022.01)
*G06F 9/451* (2018.01)

(52) U.S. Cl.
CPC ............ *G06F 9/451* (2018.02); *G06F 3/0484* (2013.01)

(58) Field of Classification Search
CPC ...... G06F 3/0481; G06F 3/0484; G06F 9/451; G06F 2203/04803
See application file for complete search history.

(56) References Cited

U.S. PATENT DOCUMENTS 9,648,062 B2 * 5/2017 Chaudhri .............. G06F 3/0484
9,652,111 B2 5/2017 Ho
(Continued)

FOREIGN PATENT DOCUMENTS

EP 2 863 298 A1 4/2015
JP 2006-115213 A 4/2006
(Continued)

OTHER PUBLICATIONS

International Search Report (PCT/ISA/210) issued by the International Searching Authority on Feb. 25, 2022 in International Patent Application No. PCT/KR2021/015802.
(Continued)

*Primary Examiner* — Alvin H Tan
(74) *Attorney, Agent, or Firm* — Sughrue Mion, PLLC

(57) ABSTRACT

An electronic device includes a display; and at least one processor operatively connected to the display, wherein the at least one processor is configured to: control the display to display a plurality of windows displaying a plurality of execution screens corresponding to a plurality of applications, wherein a first execution screen corresponding to a first application among the plurality of applications is displayed in a first window having a first size, and a second execution screen corresponding to a second application among the plurality of applications is displayed in a second window having a second size that is smaller than the first size; obtain an event related to the second application; and based on obtaining the event related to the second application, control the display to change a window that displays the second execution screen of the second application or (Continued)

display a user interface (UI) related to a multi-window disposition in the second window.

11 Claims, 15 Drawing Sheets

(56) References Cited

U.S. PATENT DOCUMENTS

| | | | |
|---|---|---|---|
| 9,891,965 B2* | 2/2018 | Hong | G06F 3/04886 |
| 10,162,494 B2 | 12/2018 | Kang et al. | |
| 10,222,840 B2* | 3/2019 | Lee | G06F 1/1643 |
| 10,379,720 B2* | 8/2019 | Ryu | G06F 3/04845 |
| 10,694,137 B2 | 6/2020 | Panchaksharaiah et al. | |
| 10,853,015 B2* | 12/2020 | Kong | G06F 3/04886 |
| 10,867,074 B2 | 12/2020 | Lee et al. | |
| 11,144,177 B2 | 10/2021 | Park et al. | |
| 11,252,826 B2* | 2/2022 | Park | H05K 1/118 |
| 11,381,781 B2* | 7/2022 | Alcantara | G06V 40/20 |
| 11,675,489 B2* | 6/2023 | Kim | G06F 1/3265 715/800 |
| 11,709,594 B2* | 7/2023 | Noh | H04M 1/0237 345/173 |
| 12,061,785 B2* | 8/2024 | Lee | G06F 1/1652 |
| 2008/0082936 A1 | 4/2008 | Helvick | |
| 2010/0066698 A1* | 3/2010 | Seo | G06F 9/4843 715/761 |
| 2011/0175930 A1 | 7/2011 | Hwang et al. | |
| 2012/0210273 A1 | 8/2012 | Seong et al. | |
| 2014/0040819 A1* | 2/2014 | Duffy | G06F 3/0481 715/789 |
| 2015/0128042 A1* | 5/2015 | Churchill | G06F 3/0488 715/718 |
| 2015/0186009 A1* | 7/2015 | Nishimura | G06F 9/445 715/804 |
| 2015/0338888 A1 | 11/2015 | Kim et al. | |
| 2016/0048316 A1 | 2/2016 | Bae et al. | |
| 2016/0154536 A1 | 6/2016 | Kim et al. | |
| 2016/0191980 A1* | 6/2016 | Yu | H04N 21/818 725/40 |
| 2017/0344253 A1 | 11/2017 | Zhang | |
| 2018/0217727 A1 | 8/2018 | Girard et al. | |
| 2019/0065240 A1* | 2/2019 | Kong | G06F 3/04886 |
| 2019/0187758 A1 | 6/2019 | Lee et al. | |
| 2019/0261519 A1* | 8/2019 | Park | G06F 1/1677 |
| 2021/0216204 A1 | 7/2021 | Lee et al. | |

FOREIGN PATENT DOCUMENTS

| | | |
|---|---|---|
| KR | 10-2011-0085233 A | 7/2011 |
| KR | 10-2012-0092485 A | 8/2012 |
| KR | 10-2013-0054072 A | 5/2013 |
| KR | 10-2014-0085039 A | 7/2014 |
| KR | 10-2015-0045121 A | 4/2015 |
| KR | 10-2017-0116883 A | 10/2017 |
| KR | 10-2425573 B1 | 7/2022 |
| WO | 2020/017743 A1 | 1/2020 |

OTHER PUBLICATIONS

Written Opinion (PCT/ISA/237) issued by the International Searching Authority on Feb. 25, 2022 in International Patent Application No. PCT/KR2021/015802.

Communication dated Mar. 21, 2024, issued by European Patent Office in European Patent Application No. 21894963.4.

* cited by examiner

ELECTRONIC DEVICE AND MULTI-WINDOW CONTROL METHOD OF ELECTRONIC DEVICE

CROSS-REFERENCE TO RELATED APPLICATIONS

This application is a bypass continuation application of International Application No. PCT/KR2021/015802, filed on Nov. 3, 2021, which claims priority to Korean Patent Application No. 10-2020-0153918, filed on Nov. 17, 2020, in the Korean Intellectual Property Office, the disclosures of which are incorporated by reference herein in their entireties.

BACKGROUND

1. Field

Various embodiments of the disclosure relate generally to an electronic device, and more particularly, to an electronic device for outputting a plurality of applications and a method of operating the same.

2. Description of the Related Art

A touch-screen refers to a display capable of receiving touch input to a screen. The touch screen may provide a function of receiving touch input by adding a touch panel to a display, and may be variously utilized due to convenience of use. In addition, as a central processing device, a memory, and a display device have been improved, a mobile device having a wider screen have been developed.

Accordingly, the mobile device may be capable of displaying a large amount of information on a screen, and the need to display windows of various modes on a screen is increased. Therefore, there is a desire for an electronic device and technique that displays display windows of various modes together on the screen of the mobile device, executes an application via the display window, and effectively determines a display mode of an execution screen of the application.

In case that an event occurs while multiple windows are executed, a user may need to perform a predetermined action such as touch input in order to switch an application. In addition, in order to change the size of a window when switching an application, a user needs to manually control the size of the window, which is inconvenient.

SUMMARY

Provided are an electronic device and method thereof that may automatically change a window disposition or may provide a user interface (UI) for the change in the case that an event related to an application occurs in a multi-window environment, whereby user convenience may be improved.

Additional aspects will be set forth in part in the description which follows and, in part, will be apparent from the description, or may be learned by practice of the presented embodiments.

According to an aspect of the disclosure, an electronic device includes: a display; and at least one processor operatively connected to the display, wherein the at least one processor is configured to: control the display to display a plurality of windows displaying a plurality of execution screens corresponding to a plurality of applications, wherein a first execution screen corresponding to a first application among the plurality of applications is displayed in a first window having a first size, and a second execution screen corresponding to a second application among the plurality of applications is displayed in a second window having a second size that is smaller than the first size: obtain an event related to the second application: and based on obtaining the event related to the second application, control the display to change a window that displays the second execution screen of the second application or display a user interface (UI) related to a multi-window disposition in the second window.

The at least one processor may be further configured to, based on obtaining the event related to the second application, control the display to change the window that displays the second execution screen of the second application from the second window to the first window.

The at least one processor may be further configured to, based on obtaining the event related to the second application, control the display to display the first execution screen of the first application in the second window.

The at least one processor may be further configured to, based on obtaining the event related to the second application, control the display to automatically change the window that displays the second execution screen of the second application.

The at least one processor may be further configured to, based on a user input to the UI related to the multi-window disposition, control the display to change the window that displays the second execution screen of the second application from the second window to another window.

The at least one processor may be further configured to, based on obtaining a plurality of events related to the applications, control the display to change windows that display execution screens of the applications based on designated priorities of the applications.

The electronic device may further include a speaker, and the at least one processor may be further configured to, based on obtaining the event related to the second application, control the speaker, which has been used for the first application, for use with the second application.

The electronic device may further include a microphone, and the at least one processor may be further configured to, based on obtaining the event related to the second application, control the microphone for use with the second application.

The electronic device may further include a camera, and the at least one processor may be further configured to, based on obtaining the event related to the second application, control the camera for use with the second application.

The at least one processor may be further configured to, based on a user input to the second window that displays the first execution screen, control the display to revert the windows that display the first execution screen and the second execution screen to windows used before window change.

According to an aspect of the disclosure, an operation method of an electronic device, includes: displaying, in a display of the electronic device, a plurality of windows displaying a plurality of execution screens corresponding to a plurality of applications, wherein a first execution screen corresponding to a first application among the plurality of applications is displayed in a first window having a first size, and a second execution screen corresponding to a second application among the plurality of applications is displayed in a second window having a second size that is smaller than the first size: obtaining an event related to the second application; and based on the obtaining the event related to the second application, changing a window that displays the second execution screen of the second application or displaying a user interface (UI) related to a multi-window disposition in the second window.

The operation method may further include, based on the obtaining the event related to the second application, changing the window that displays the second execution screen of the second application from the second window to the first window.

The operation method may further include, based on the obtaining the event related to the second application, displaying the first execution screen of the first application in the second window.

The operation method may further include, based on the obtaining the event related to the second application, automatically changing the window that displays the second execution screen of the second application.

The operation method may further include changing, based on a user input to the UI related to the multi-window disposition, the window that displays the second execution screen of the second application from the second window to another window.

BRIEF DESCRIPTION OF DRAWINGS

The above and other aspects, features, and advantages of certain embodiments of the present disclosure may be more apparent from the following description taken in conjunction with the accompanying drawings, in which.

DETAILED DESCRIPTION

Figure 1:
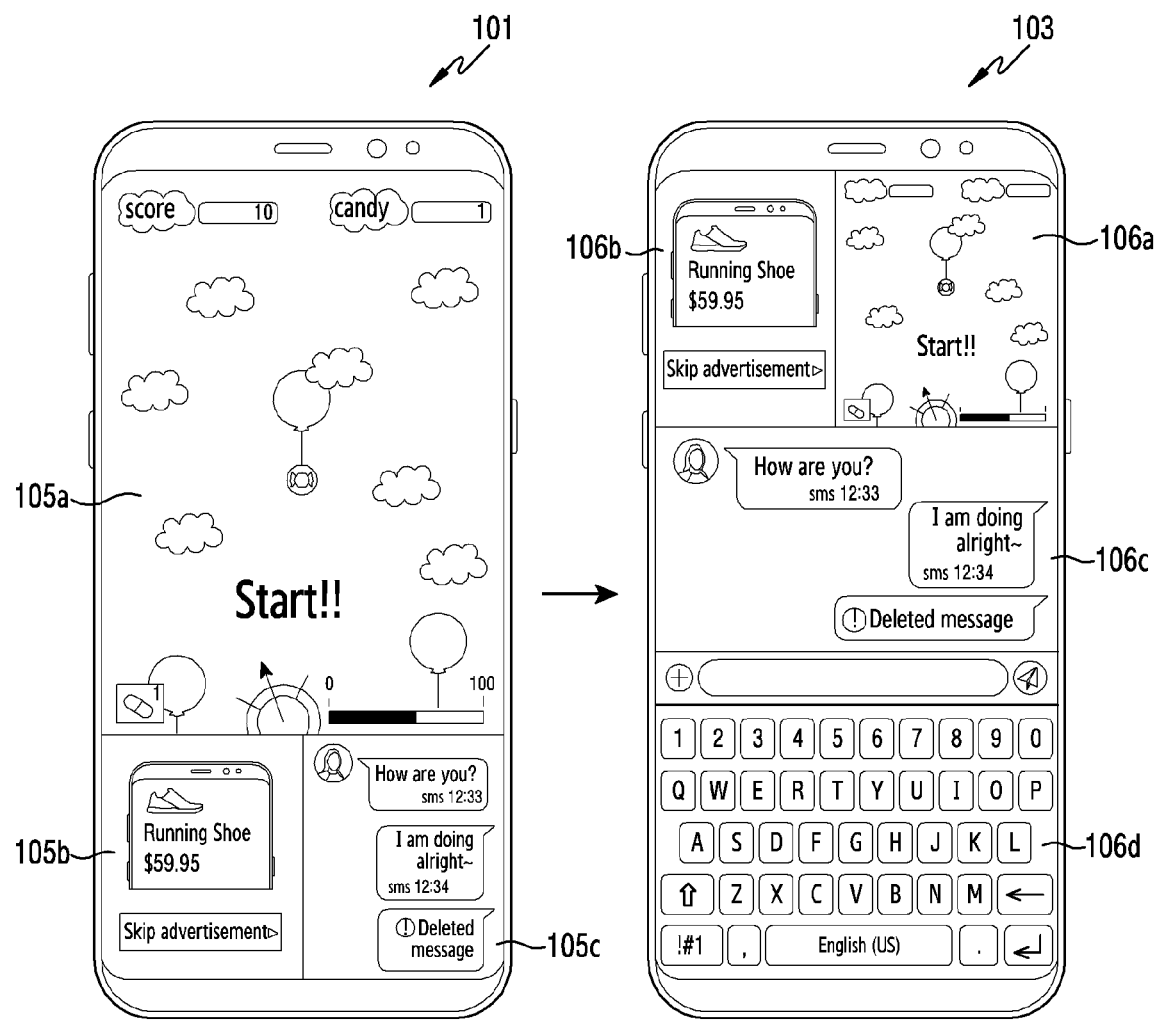
FIG. 1 is a diagram illustrating an execution screen of an application in an electronic device, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art are to recognize that various changes and modifications of the embodiments described herein can be made without departing from the scope and spirit of the disclosure. In addition, descriptions of well-known functions and structures are omitted for clarity and conciseness.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Embodiments of the disclosure will be described in detail below with reference to the accompanying drawings. Identical or like reference numerals in the drawings denote identical or like component elements.

FIG. 1 is a diagram illustrating an execution screen of an application in an electronic device according to an embodiment.

Referring to FIG. 1, an electronic device according to an embodiment may display an execution screen of at least one application in a display. According to an embodiment, the execution screens of a plurality of applications may be displayed in a plurality of areas in a display screen. For example, as illustrated in a first screen 101, an execution screen of a first application, an execution screen of a second application, and an execution screen of a third application may be displayed in a first window 105a, a second window 105b, and a third window 105c, respectively.

According to an embodiment, a display screen may be divided into at least one sub-window and a main window that are areas in which execution screens of applications may be displayed. For example, the first window 105a that is the largest area in the first screen 101 may be divided as a main window and the second window 105b and the third window 105c may be divided as sub-windows.

According to an embodiment, in case that an event related to an application executed in a sub-window occurs, the electronic device may change the sub-window in response to the occurrence of the event. According to an embodiment, the electronic device may display a user interface (UI) based on an attribute of an application in which an event occurs. For example, as illustrated in a second screen 103, the electronic device may display an input user interface (UI) 106d in response to occurrence of an event related to a message application. For example, the electronic device may display a screen including at least one of an input field for displaying information input by user, a key pad for inputting text, an emoticon list for inputting an emoticon, or a picture input icon for inputting a picture. According to an embodiment, in response to occurrence of an event, the electronic device may change the sizes and/or locations of the first window 106a, the second window 106b, and the third window 106c. According to an embodiment, after changing a window, the third window 106c may be divided as the main window, and the first window 106a and the second window 106b may be divided as sub-windows.

Figure 2:
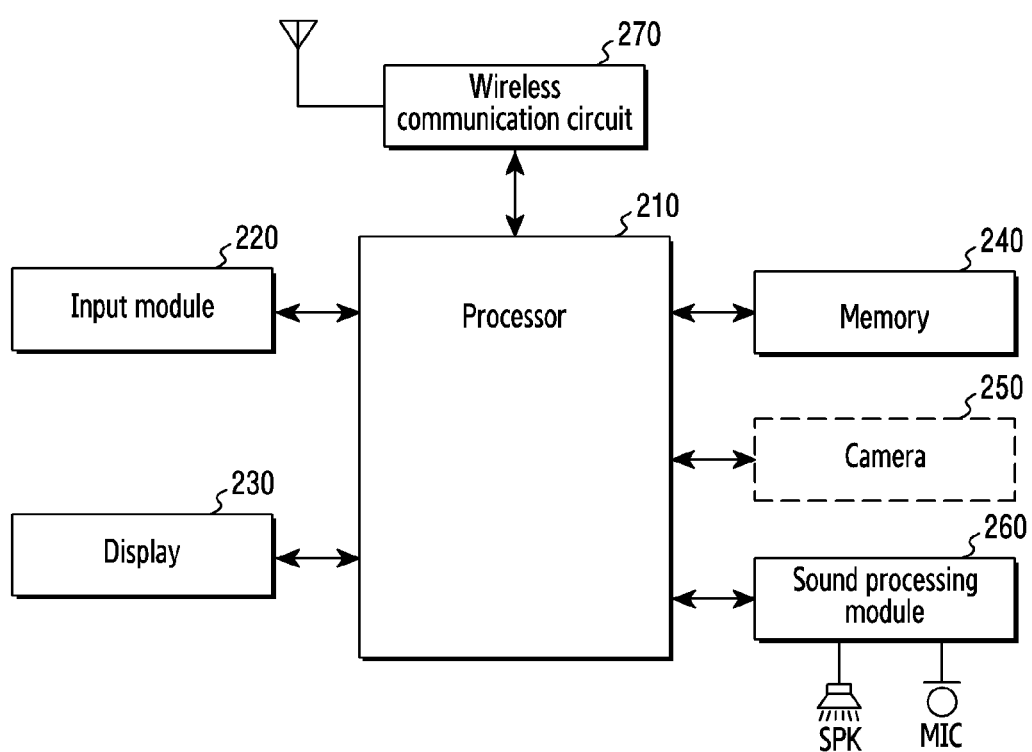
FIG. 2 is a block diagram of an electronic device, according to an embodiment.

FIG. 2 is a block diagram of an electronic device according to an embodiment.

Referring to FIG. 2, an electronic device according to an embodiment may include a processor 210, an input module 220, a display 230, a memory 240, a camera 250, a sound processing module 260, and a wireless communication circuit 270. According to various embodiments, the electronic device may include additional component elements in addition to the component elements illustrated in FIG. 2, or may omit at least one of the component elements illustrated in FIG. 2.

According to an embodiment, using instructions stored in the memory 240, the processor 210 may execute operations or data processing in association with control and/or communication of at least one other component element of the electronic device. According to an embodiment, the processor 210 may include at least one of a central processing unit (CPU), a graphic processing unit (GPU), a micro controller unit (MCU), a sensor hub, a supplementary processor, a communication processor, an application processor, an application specific integrated circuit (ASIC), and/or a field programmable gate arrays (FPGA), and may include a plurality of cores.

According to an embodiment, the processor 210 may process data obtained from the input module 220 and the sound processing module 260, or may control operation states of the input module 220 and the sound processing module 260. According to an embodiment, the processor 210 may transmit and/or receive a signal via the wireless communication circuit 270. According to an embodiment, the processor 210 may display various screens via the display 230.

A detailed description related to a method of operating the processor 210 is provided later with reference to FIGS. 4, 10, and 11.

According to an embodiment, the input module 220 may detect input from the outside (e.g., a user) and may provide, to the processor 210, data corresponding to the input. According to an embodiment, the input module 220 may include at least one hardware module for detecting input. For example, the at least one hardware module may include at least one of a sensor, a keyboard, a key pad, a touch pad, and a touch panel. According to an embodiment, in the case that the input module 220 is embodied as a touch panel, the input module 220 may be coupled to the display 230 and may provide a touch screen. For example, the input module 220 may provide, to the processor 210, data associated with user touch input (e.g., a tap, a press, a pinch, a stretch, a slide, a swipe, a rotation input, or the like).

According to an embodiment, the display 230 may perform functions of outputting information in the forms of a number, a character, an image, a graphic, and the like. According to an embodiment, the display 230 may include at least one hardware module for outputting. For example, the hardware module may include at least one among a liquid crystal display (LCD), a light emitting diode (LED), a light emitting polymer display (LPD), an organic light emitting diode (OLED), an active matrix organic light emitting diode (AMOLED), and a flexible LED (FLED). That is, the display 230 may display a screen corresponding to data received from the processor 210. The display 230 may be referred to as an 'output unit', a 'display unit', or other terms having a technical meaning equivalent thereto.

According to an embodiment, the memory 240 may store data such as a basic program, an application program, configuration information, and the like for operating an electronic device. According to an embodiment, the memory 240 may be embodied as volatile memory, non-volatile memory, or a combination of volatile memory and non-volatile memory. According to an embodiment, the memory 240 may provide data stored therein in response to a request from the processor 210. According to an embodiment, the memory 240 may store an operating system (OS) program and at least one application (applications).

According to an embodiment, the camera 250 may shoot a still image and/or a video. According to an embodiment, in response to obtaining an event related to an application, the electronic device may be configured to control the camera 250 for the application in which the event occurs.

According to an embodiment, the sound processing module 260 may include at least one of a speaker for outputting an audio signal of the electronic device and a microphone for collecting an audio signal. According to an embodiment, the sound processing module 260 may be equipped with a speaker, a microphone, and a voice codec for processing an audio signal input or output via the microphone and the speaker. According to an embodiment, in the case of performing communication by telephone according to a mobile communication function, the sound processing module 260 may receive input of user voice or output audible sounds to a user, and may output processing sounds corresponding to various operations or sounds corresponding to a digital audio content or a video content. According to an embodiment, in response to obtaining an event related to an application, the electronic device may be configured to control a microphone and/or a speaker for the application in which the event occurs.

According to an embodiment, the wireless communication circuit 270 may provide an interface for communication with other systems or devices. For example, the wireless communication circuit 270 may include a wireless transceiving unit or a network interface card that may enable communication via an external network (e.g., a network). For example, the wireless communication circuit 270 may perform a signal processing for accessing a wireless network. For example, the wireless network may include at least one of a wireless LAN and a cellular network (e.g., long term evolution (LTE)).

Figure 3:
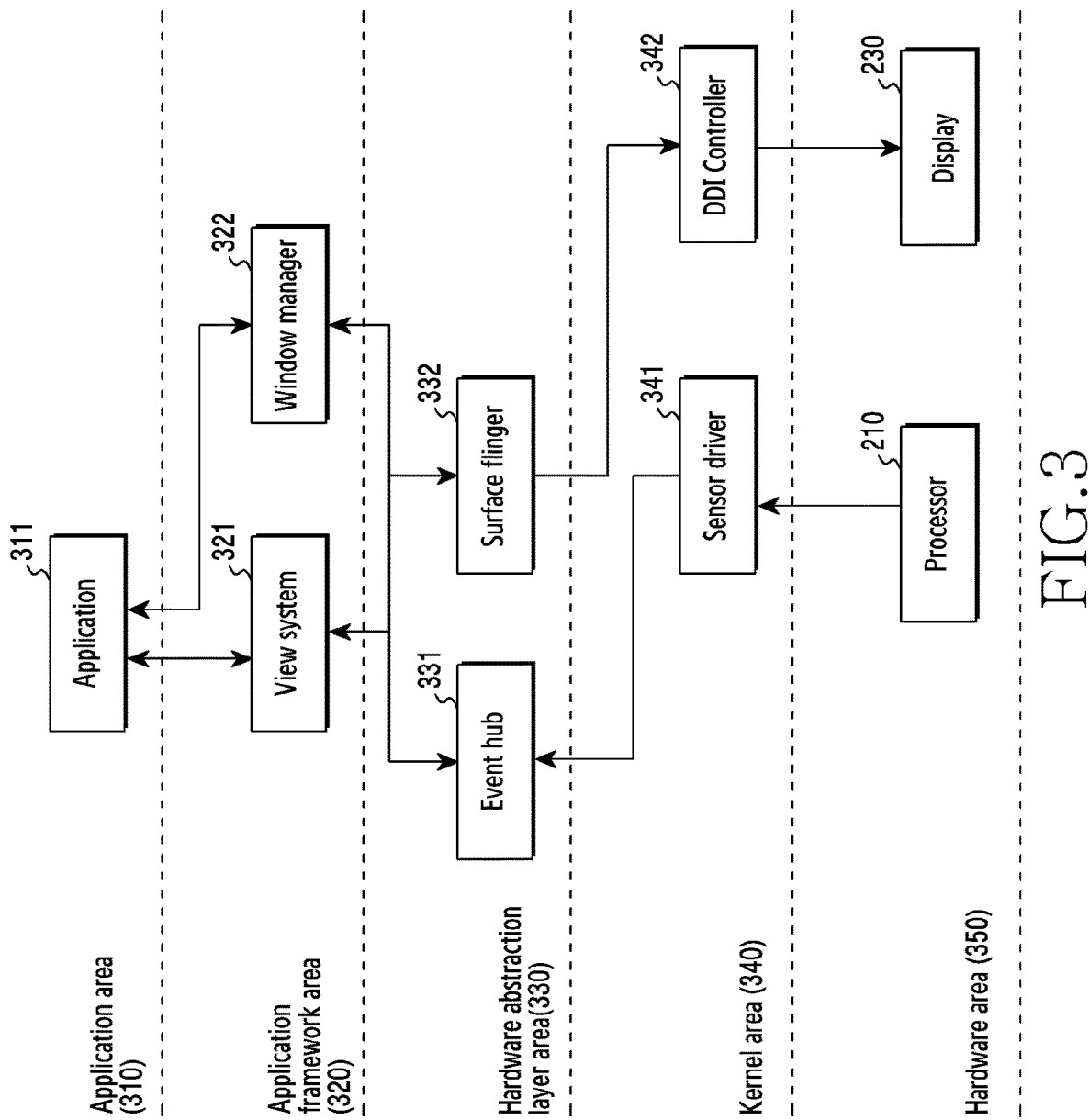
FIG. 3 is a diagram illustrating a hierarchical view structure of an electronic device, according to an embodiment.

FIG. 3 is a diagram illustrating a hierarchical view structure of an electronic device according to an embodiment.

According to an embodiment, a hierarchical view structure of an electronic device may include an application area 310, an application framework area 320, a hardware abstraction layer area 330, a kernel area 340, and a hardware area 350. According to an embodiment, the application area 310 may include an application 311. According to an embodiment, the application framework area 320 may include a view system 321 and a window manager 322. According to an embodiment, the hardware abstraction layer area 330 may include an event hub 331 and a surface flinger 332. According to an embodiment, the kernel area 340 may include a sensor driver 341 and a DDI controller 342. According to an embodiment, the hardware area 350 may include the processor 210 and the display 230.

According to an embodiment, in the case that the application 311 in the application area 310 is executed, the application may request a view system 321 and a window manager 322 in the framework area 320 to configure a screen related to the application 311. According to an embodiment, the view system 321 and the window manager 322 may obtain data related to a screen configuration from the hardware abstraction layer area 330 or may transfer the same to the hardware abstraction layer area 330.

According to an embodiment, the application 311 may request the view system 321 and the window manager 322 to configure a screen. According to an embodiment, the view system 321 may request configuration of a screen from the event hub 331 and/or surface flinger 332 in response to the request from the application 311. According to an embodiment, the window manager 322 may determine the size (or resolution) of the window in response to the request from the application 311. For example, based on information (e.g., size or resolution information) associated with the display 230, the window manager 322 may determine the size of a window.

According to an embodiment, the event hub 331 in the hardware abstraction layer area 330 may process an event that occurs in the electronic device. According to an embodiment, the surface flinger 332 may allocate a frame buffer according to the window size determined by the window manager 322, and may render a content appropriate for the corresponding frame. For example, in response to the request from the view system 321, the surface flinger 332 may produce a surface image in a size corresponding to the window size determined by the window manager 322 and may blend the produced surface images, so as to produce image information. According to an embodiment, in the case of the image information produced by the surface flinger 332, a size may be changed (increased or decreased) to correspond to a screen resolution via a hardware scaler.

According to an embodiment, the processor 210 of the hardware area 350 may produce, based on the image information, a screen to be displayed in the display 230, and the DDI controller 342 in the kernel area 340 may allocate a resource to the display 230 and transfer the produced screen to the display 230 so that the produced screen is displayed on the display 230.

Figure 4:
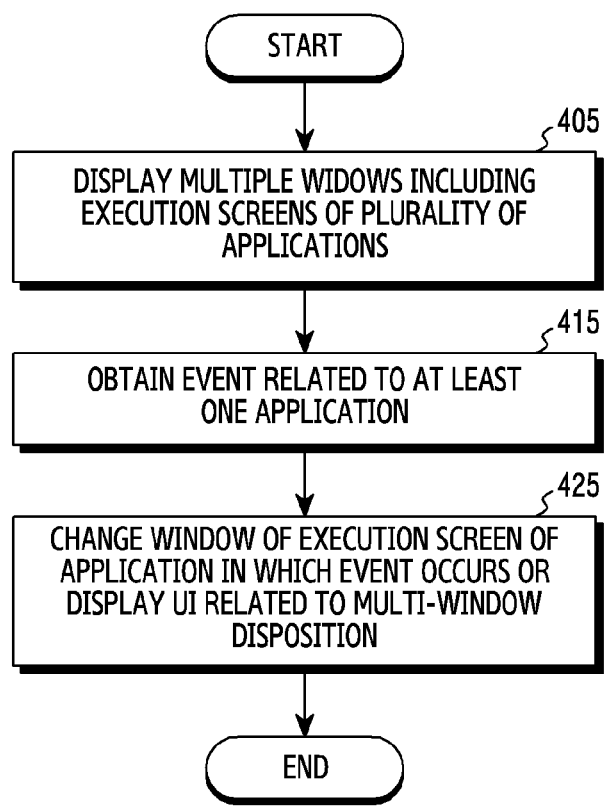
FIG. 4 is a flowchart illustrating controlling a multi-window disposition of an electronic device, according to an embodiment.

FIG. 4 is a flowchart illustrating controlling a multi-window disposition of an electronic device according to an embodiment. In the embodiments hereinafter, operations may be performed sequentially, but it is not necessarily limited thereto. For example, the order of operations may be changed, and/or at least two operations may be performed in parallel.

Referring to FIG. 4, the processor 210 according to an embodiment may display multiple windows including execution screens of a plurality of applications in operation 405. According to an embodiment, the processor 210 may determine a window having the largest size among a plurality of windows as a main window, and may determine the remaining windows as sub-windows.

According to an embodiment, the processor 210 may obtain an event related to at least one application in operation 415. According to an embodiment, the processor 210 may obtain an event related to an application of which an execution screen is displayed in a sub-window. For example, an event may include reception of a text message, reception of a phone call, reception of an e-mail, reception of a messenger message, reception of a notification from an SNS application, notifications from various applications, and the like. According to an embodiment, the processor 210 may obtain events that occur in a plurality of applications, together.

According to an embodiment, in operation 425, the processor 210 may change the window that displays the execution screen of the application in which an event occurs. According to an embodiment, in response to obtaining the event related to the application of which the execution screen is displayed in a sub-window, the processor 210 may change the locations of the sub-window and the main window.

According to an embodiment, the processor 210 may change the sizes of multiple windows when obtaining an event. For example, in case that an event is obtained that is related to an application of which the execution screen is displayed in a sub-window, the sub-window may be enlarged in a predetermined ratio and the main window may be diminished in a predetermined ratio.

According to an embodiment, the processor 210 may display a UI based on an attribute of an application in which an event occurs. For example, the processor 210 may display an input UI in case that at least one of a text message, an email, and a messenger message is received.

According to an embodiment, in case that events that occur in the plurality of applications are received together, the processor 210 may determine a window (main window) that is to be enlarged to have the largest size. For example, the processor 210 may determine a window that displays an application in which an event occurs last as a window to be enlarged to have the largest size. As another example, the processor 210 may determine, based on an attribute of an application in a window, a window to be enlarged to have the largest size. As another example, based on designated priorities, the processor 210 may determine a window to be enlarged to have the largest size.

According to an embodiment, the processor 210 may display a UI related to a multi-window disposition in response to obtaining an event. For example, a UI related to a multi-window disposition may include a button for switching a main window and a sub-window or a button for selecting a layout desired by a user.

Figure 5:
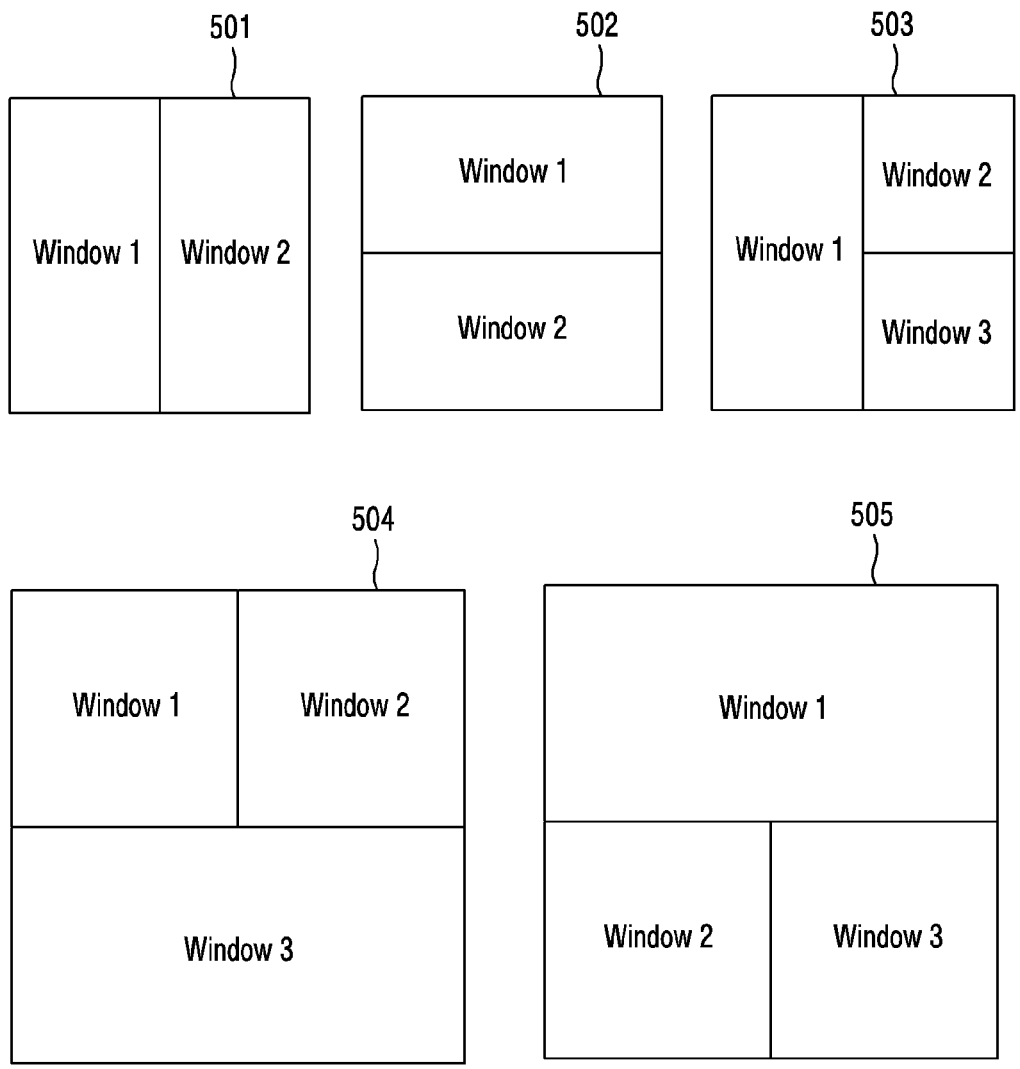
FIG. 5 is a diagram illustrating a multi-window disposition, according to various embodiments.

FIG. 5 is a diagram illustrating a multi-window disposition according to various embodiments.

Referring to FIG. 5, the processor 210 according to an embodiment may display execution screens of a plurality of applications in multiple areas of a display screen together. According to an embodiment, display screens 501, 502, 503, 504, and 505 may display applications and events in various sized windows in various forms. According to an embodiment, the size and/or location of a window may be changeable.

Figure 6:
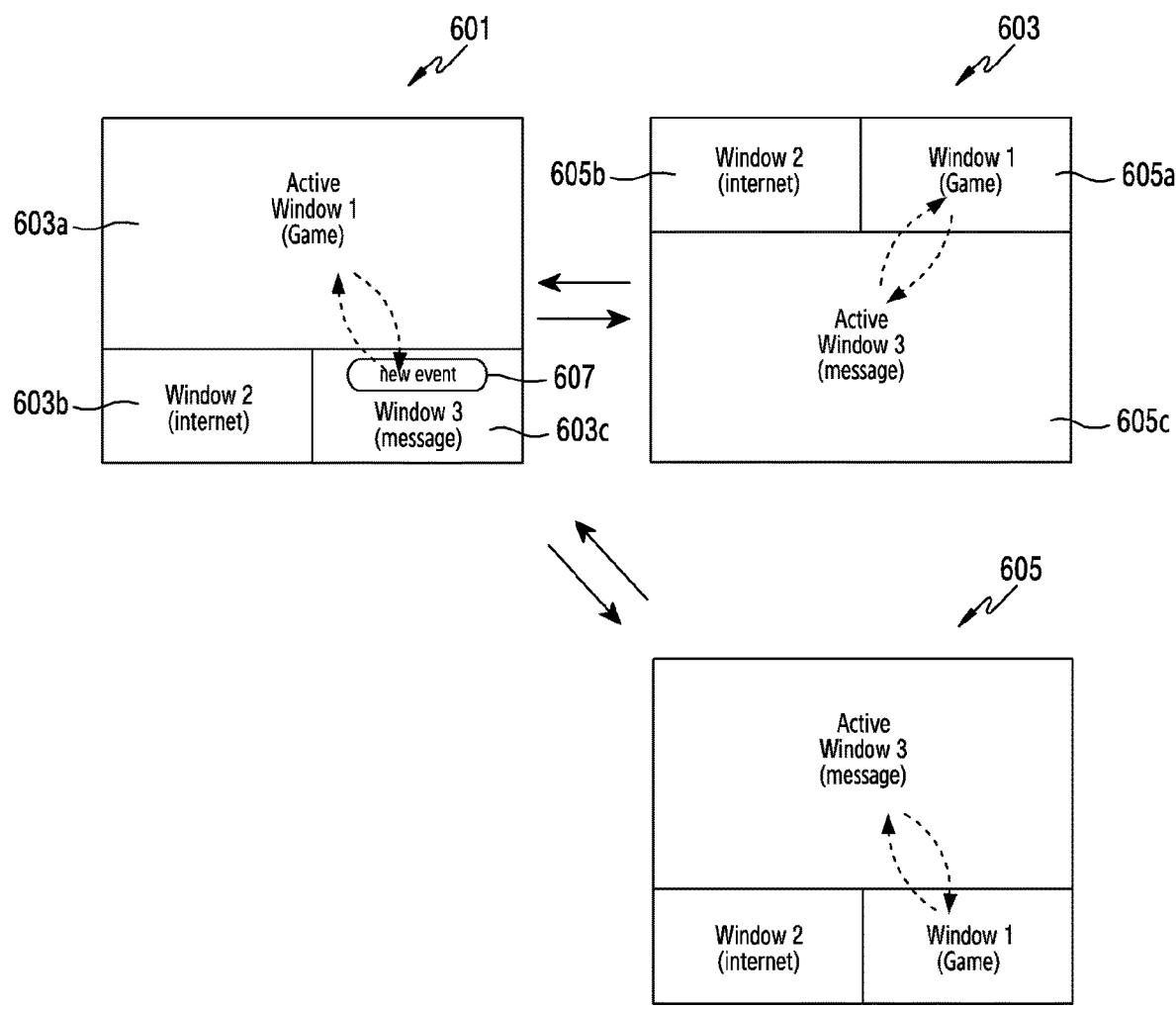
FIG. 6 is a diagram illustrating changing of the location of a window that displays an execution screen of an application in which an event occurs, in an electronic device, according to an embodiment.

FIG. 6 is a diagram illustrating a change of the location of a window that displays an execution screen of an application in which an event occurs, in an electronic device, according to an embodiment.

According to an embodiment, as illustrated in a first screen 601, the processor 210 may display an execution screen of a first application, an execution screen of a second application, and an execution screen of a third application in a first window 603a, a second window 603b, and a third window 603c, respectively. According to an embodiment, the processor 210 may identify the first window 603a that has the largest size as a main window and may identify the second window 603b and the third window 603c as sub-windows.

According to an embodiment, the processor 210 may obtain an event that occurs in association with at least one application. According to an embodiment, the processor 210 may provide the obtained event via a display. For example, the processor 210 may display, in the third window 603c, a UI 607 related to an event that occurs in association with a third application.

According to an embodiment, in response to obtaining an event, the processor 210 may automatically change the size of a window in which an application having the event that occurs is executed. For example, as illustrated in a second screen 603, in case that an event related to the third application occurs, the processor 210 may change the size of the third window 605c to be larger. According to an embodiment, the processor 210 may change the size of the third window 605c to the size of the main window in the first screen 601, and may change the size of the first window 605a to the size of the sub-window in the first screen 601. In addition, the size of the second window 605b that displays an execution screen of the second application in which an event does not occur may be maintained. According to an embodiment, the processor 210 may identify the third window 605c as a main window in the second screen 603.

According to an embodiment, in response to obtaining an event, the processor 210 may automatically change the location of a window in which an application having the event that occurs is executed. For example, as illustrated in a third screen 605, in case that an event related to the third application occurs, the processor 210 may change the location of the third window 603c and the location of the first window 603a that is the main window.

According to an embodiment, the processor 210 may perform control so that hardware is to be used for an application of which an execution screen is displayed in the main window. For example, control may be performed so that hardware is to be used for the first application in the first screen 601 and hardware is to be used for the third application in the second screen 603. Specifically, in case that an event associated with the third application is obtained while at least one piece of hardware among a speaker, a microphone, or a camera is used for the first application, control may be performed automatically so that at least one hardware is to be used for the third application.

According to the above-described embodiments, the electronic device may automatically enlarge the size of a window that displays an execution screen of an application that receives an event, thereby improving user experience.

Figure 7A:
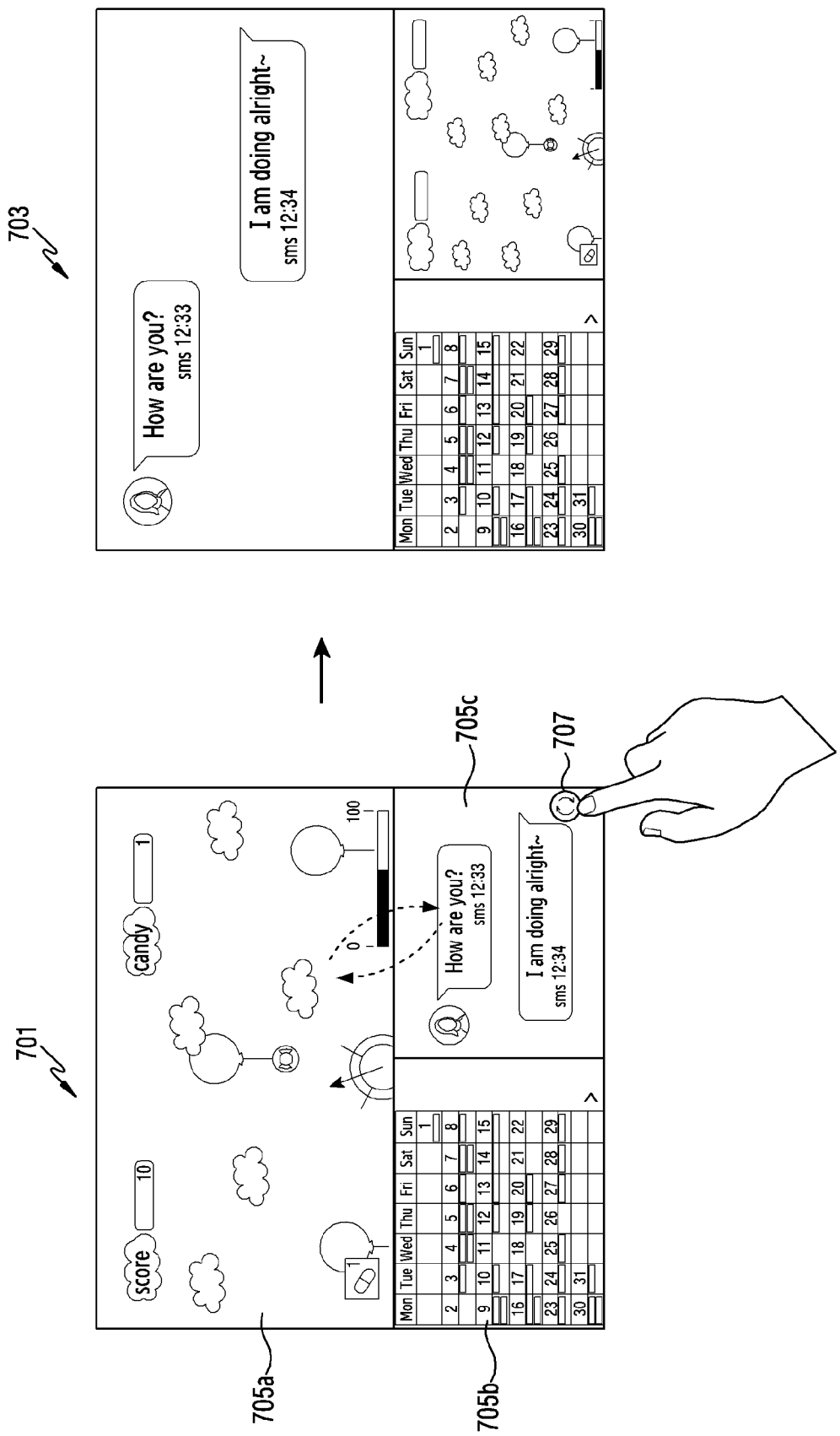
FIG. 7A is a diagram illustrating displaying of a user interface (UI) related to a window location change in a window that displays an execution screen of an application in which an event occurs, in an electronic device, according to an embodiment.

FIG. 7A is a diagram illustrating displaying of a UI related to a window location change in a window that displays an execution screen of an application in which an event occurs, in an electronic device, according to an embodiment.

According to an embodiment, as illustrated in a first screen 701, the processor 210 may display an execution screen of a first application, an execution screen of a second application, and an execution screen of a third application in a first window 705a, a second window 705b, and a third window 705c, respectively.

According to an embodiment, the processor 210 may obtain an event that occurs in association with at least one application. According to an embodiment, the processor 210 may display a UI 707 related to a window location change in response to obtaining an event. For example, in case that an event related to a third application occurs, the UI 707 related to a window location change may be displayed in the third window 705c.

According to an embodiment, based on user input to the UI 707 related to a window location change, the processor 210 may change the location of a window that displays an execution screen of an application. For example, as illustrated in a second screen 703, in case that an event related to a third application occurs, the processor 210 may display the execution screen of the third application in the first window 705a. In addition, the execution screen of the first application may be displayed in the third window 705c, and the location of the execution screen of the second application in which an event does not occur may be maintained.

According to an embodiment, in response to user input to a window that displays an execution screen of an application in which an event occurs, the processor 210 may change the location and/or size of the corresponding window. For example, in case that an event related to the third application occurs, the processor 210 may change the third window as a main window in response to user input to at least one area of the third window.

Figure 7B:
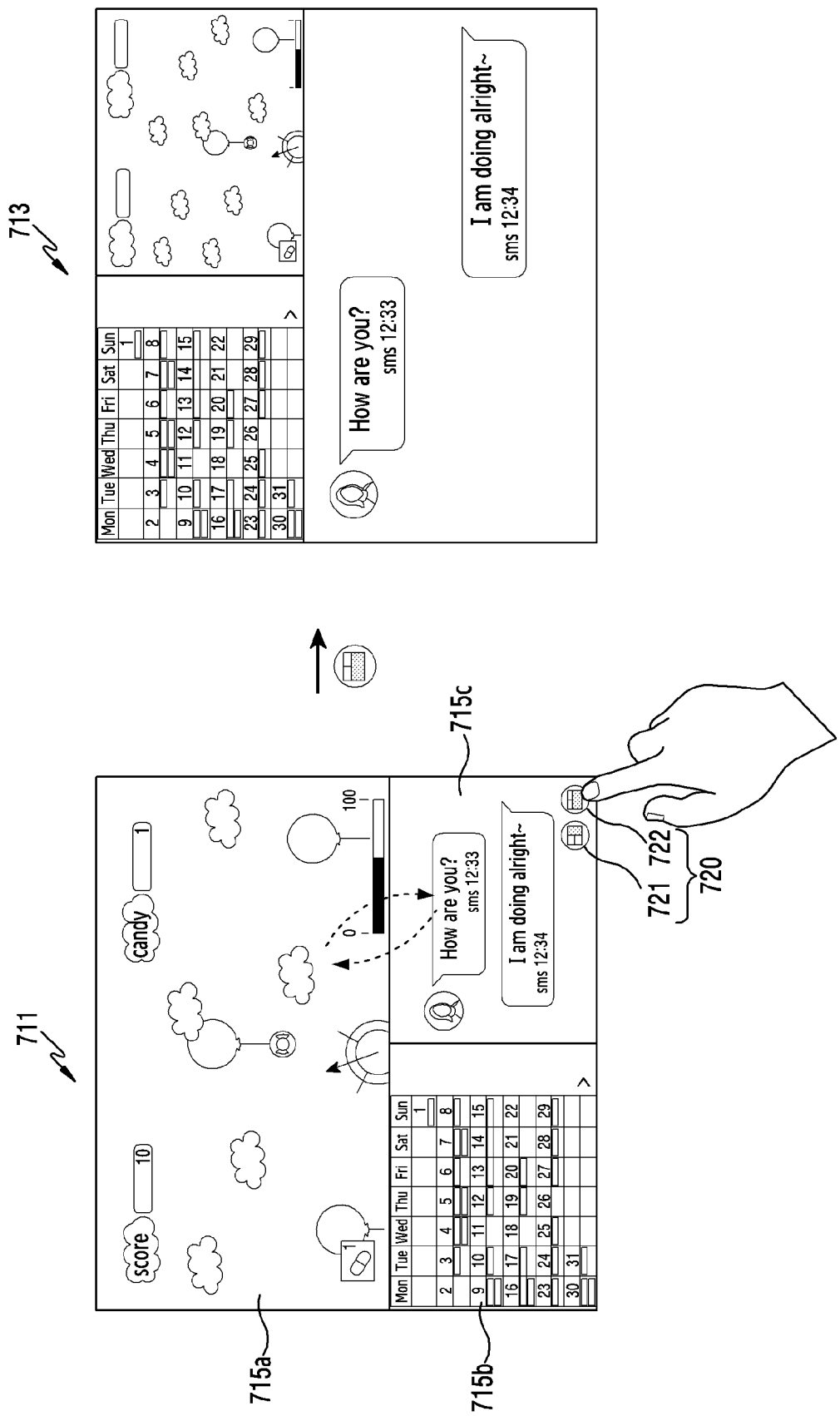
FIG. 7B is a diagram illustrating displaying of a UI related to a window disposition in a window that displays an execution screen of an application in which an event occurs, in an electronic device, according to an embodiment.

FIG. 7B is a diagram illustrating displaying of a UI related to a window disposition in a window that displays an execution screen of an application in which an event occurs, in an electronic device, according to an embodiment.

According to an embodiment, as illustrated in a first screen 711, the processor 210 may display an execution screen of a first application, an execution screen of a second application, and an execution screen of a third application in a first window 715a, a second window 715b, and a third window 715c, respectively.

According to an embodiment, the processor 210 may display a UI 720 related to window disposition in response to obtaining an event that occurs in association with at least one application. For example, in case that an event related to a third application occurs, the UI 720 related to a window disposition may be displayed in the third window 715c. According to an embodiment, the UI 720 related to a window disposition may include a first UI 721 and a second UI 722 which have different layout dispositions from each other.

According to an embodiment, based on user input to the UI 720 related to a window disposition, the processor 210 may change the disposition of a window that displays an execution screen of an application. For example, as illustrated in a second screen 713, based on user input to a second UI 722, the processor 210 may change a window disposition to a disposition corresponding to a layout of the second UI 722.

According to the above-described embodiments, the electronic device may provide UIs related to various multi-window layouts so that a user is capable of using a desired layout via switching.

Figure 8:
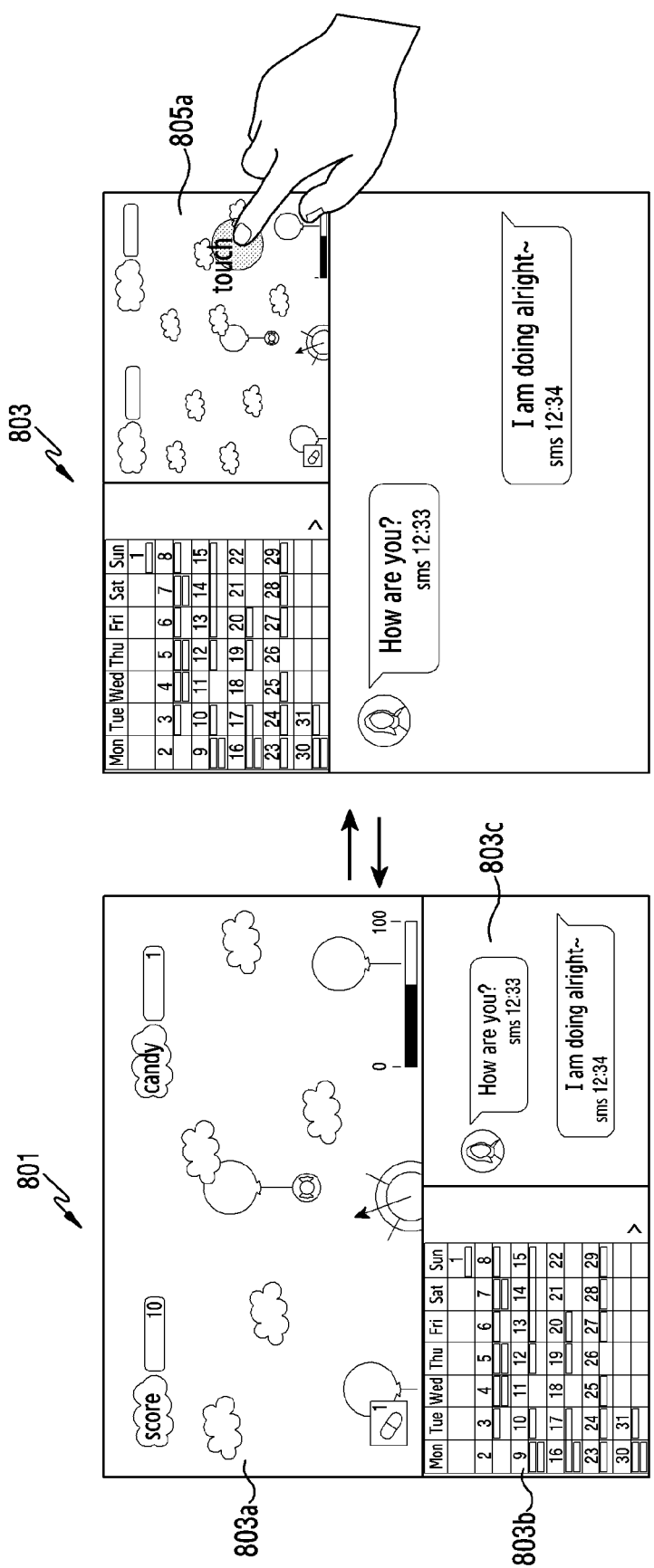
FIG. 8 is a diagram illustrating reverting to a window used before an event occurs, based on user input in an electronic device, according to an embodiment.

FIG. 8 is a diagram illustrating reverting to a window used before an event occurs, based on user input in an electronic device according to an embodiment. A description that corresponds to or is the same as or similar to the description that has been provided with reference to FIG. 8 is briefly described or omitted.

Referring to FIG. 8, an electronic device according to an embodiment may display an execution screen of a first application, an execution screen of a second application, and an execution screen of a third application in a first window 803a, a second window 803b, and a third window 803c, respectively, in a first screen 801.

According to an embodiment, in case that an event related to an application executed in a sub-window occurs, the processor 210 may automatically change a multi-window disposition. According to another embodiment, in case that an event related to an application executed in a sub-window occurs, the processor 210 may display a UI related to a multi-window disposition, and may change the multi-window disposition based on user input to the UI.

According to an embodiment, based on user input to the window 805a in which the first application is executed in a second screen 803, the processor 210 may enable the second screen 803 in which a multi-window disposition has been changed to revert to a window disposition used before the change. For example, based on a touch input (e.g., a press or a long-press) to a window in which the first application is executed, the processor 210 may enable the second screen 803 to revert to the first screen 801.

According to an embodiment, in case that a user input related to an application in which an event occurs is not present in the second screen 803 during a predetermined period of time, the processor 210 may enable the second screen 803 to revert a window disposition used before the change. For example, in case that user input to a window in which a third application having an event that occurs is executed is determined as not being present, the processor 210 may enable the second screen 803 to revert to the first screen 801.

Figure 9A:
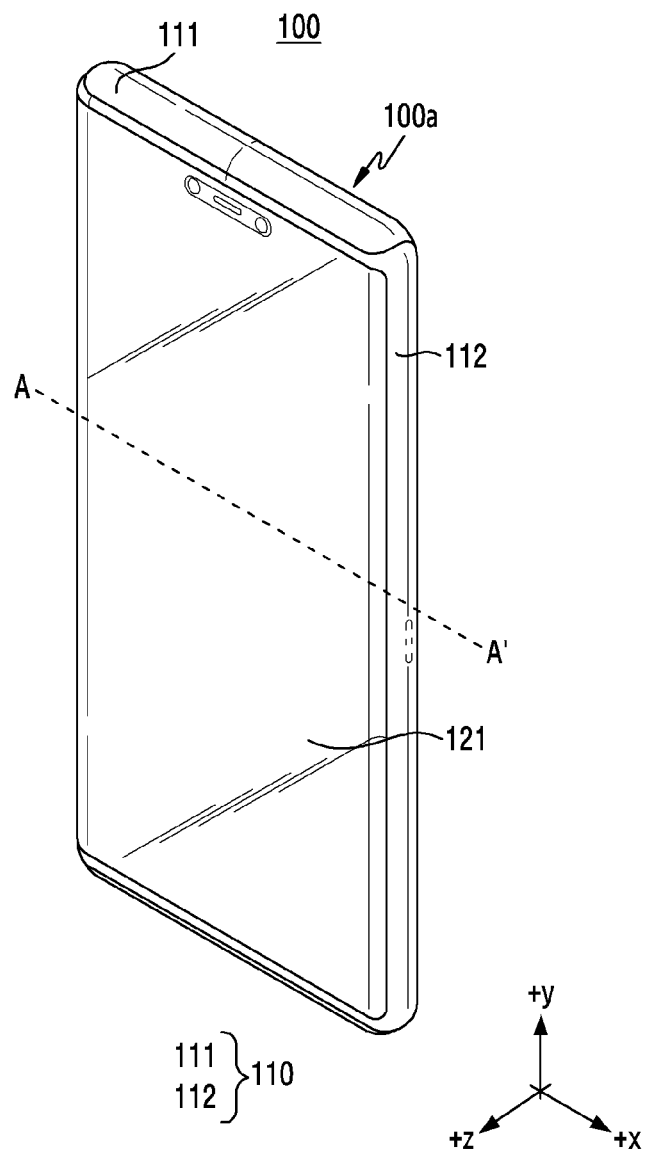
FIG. 9A is a front perspective view of an electronic device in a first state, according to an embodiment.
Figure 9B:
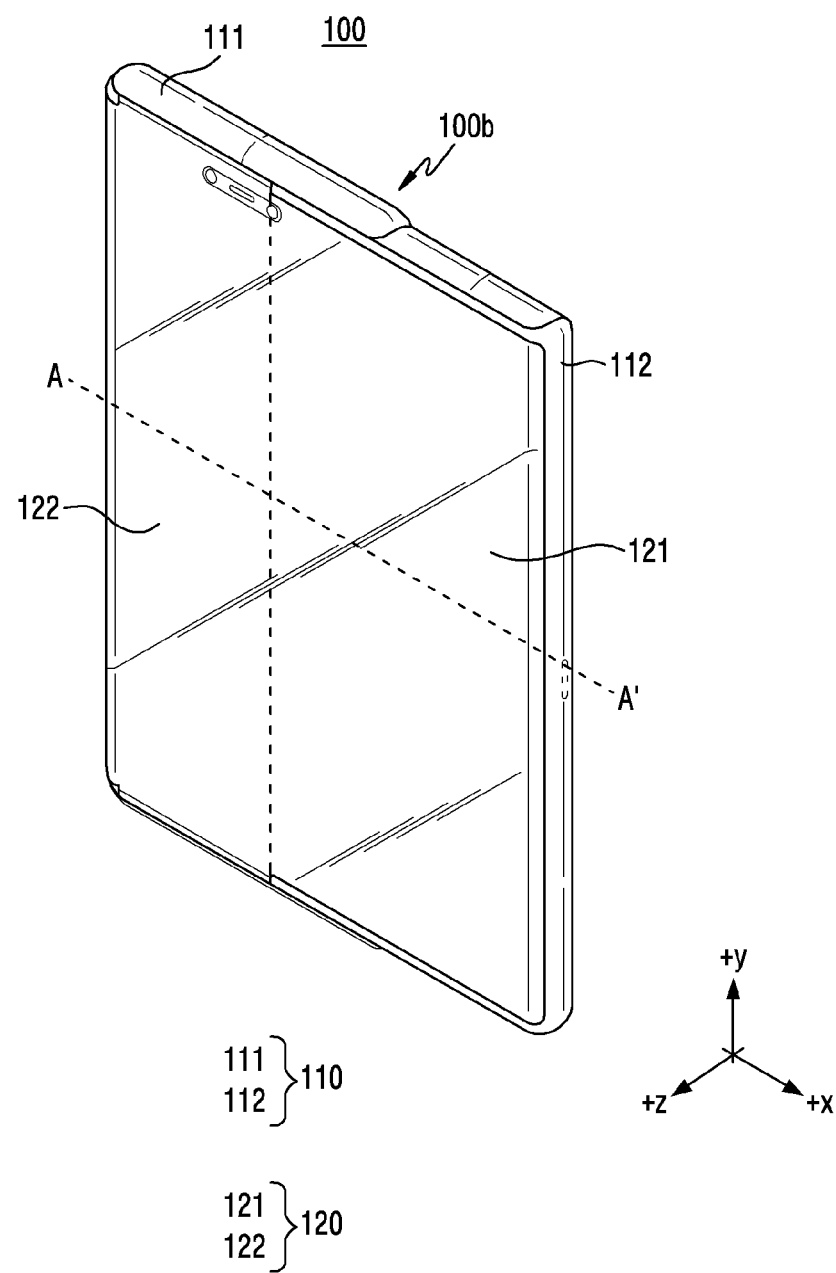
FIG. 9B is a front perspective view of an electronic device in a second state, according to an embodiment.

FIG. 9A is a front perspective view of an electronic device in a first state, according to an embodiment. FIG. 9B is a front perspective view of an electronic device in a second state, according to an embodiment.

According to various embodiments disclosed in the document, a side that faces in a direction substantially the same as a direction in which at least a part (e.g., a first part 121) of the flexible display 120 located outside the electronic device 100 faces may be defined as the front side of the electronic device 100, and an opposed side of the front side may be defined as the rear side of the electronic device 100. A side that encloses space between the front side and the rear side may be defined as a lateral side of the electronic device 100.

The flexible display 120 may be disposed in at least a part of the electronic device 100 according to an embodiment. According to an embodiment, the flexible display 120 may be disposed to include at least a partial plane shape and at least a partial curved shape. According to an embodiment, the flexible display 120 and a slidable housing 110 that encloses at least a part of an edge of the flexible display 120 may be disposed in the front side of the electronic device 100.

According to an embodiment, the slidable housing 110 may form a partial area of the front side (e.g., the side of the electronic device 100 that faces in +z direction of FIGS. 9A and 9B) of the electronic device 100, the rear side (the side of the electronic device 100 that faces in-z direction of FIGS. 9A and 9B), and the lateral side (the side that connects the front side and the rear side of the electronic device 100). According to another embodiment, the slidable housing 110 may form the rear side and a partial area of the lateral side of the electronic device 100.

According to an embodiment, the slidable housing 110 may include a first housing 111 and a second housing 112 coupled to the first housing 111 to be movable within a predetermined range.

According to an embodiment, the flexible display 120 may include a first part 121 to be coupled to the second housing 112, and a second part 122 that is extendable from the first part 121 and is capable of being pulled in the electronic device 100.

According to an embodiment, the electronic device 100 may include a first state 100a and a second state 100b. For example, the first state 100a and the second state 100b of the electronic device 100 may be determined based on the location of the second housing 112 relative to that of the slidable housing 110, and the electronic device 100 may be configured to be changed between the first state 100a and the second state 100b according to user operation or mechanical operation.

According to various embodiments, the first state 100a of the electronic device 100 may be the state that is before the slidable housing 110 is extended. The second state 100b of the electronic device 100 may be the state in which the slidable housing 100 is extended.

According to an embodiment, in case that the electronic device 100 is changed from the first state 100a to the second state 100b as the second housing 112 moves, the second part 122 of the flexible display 120 may pulled out (or be exposed) to the outside from the inside of the electronic device 100. According to various embodiments of the disclosure, the flexible display 120 being in a pulled out state (or exposed state) may indicate that the flexible display 120 is viewable from the outside of the electronic device 100. According to another embodiment, in case that the electronic device 100 is changed from the second state 100b to the first state 100a as the second housing 112 moves, the second part 122 of the flexible display 120 may be pulled in the electronic device 100. According to various embodiments of the disclosure, the flexible display 120 being in pulled in state may indicate that the flexible display 120 is not viewable from the outside. According to various embodiments of the disclosure, the flexible display 120 may be referred to as a display.

The form of an electronic device illustrated in FIG. 9A and FIG. 9B is to describe an example of an electronic device that is capable of extending a display area, and the form of the electronic device is not limited to FIG. 9A and FIG. 9B. For example, the electronic device may be configured as an electronic device equipped with a rollable display. In the electronic device equipped with a rollable display, a part remaining after excluding a rolled part from the display may be determined as a display area.

Figure 10:
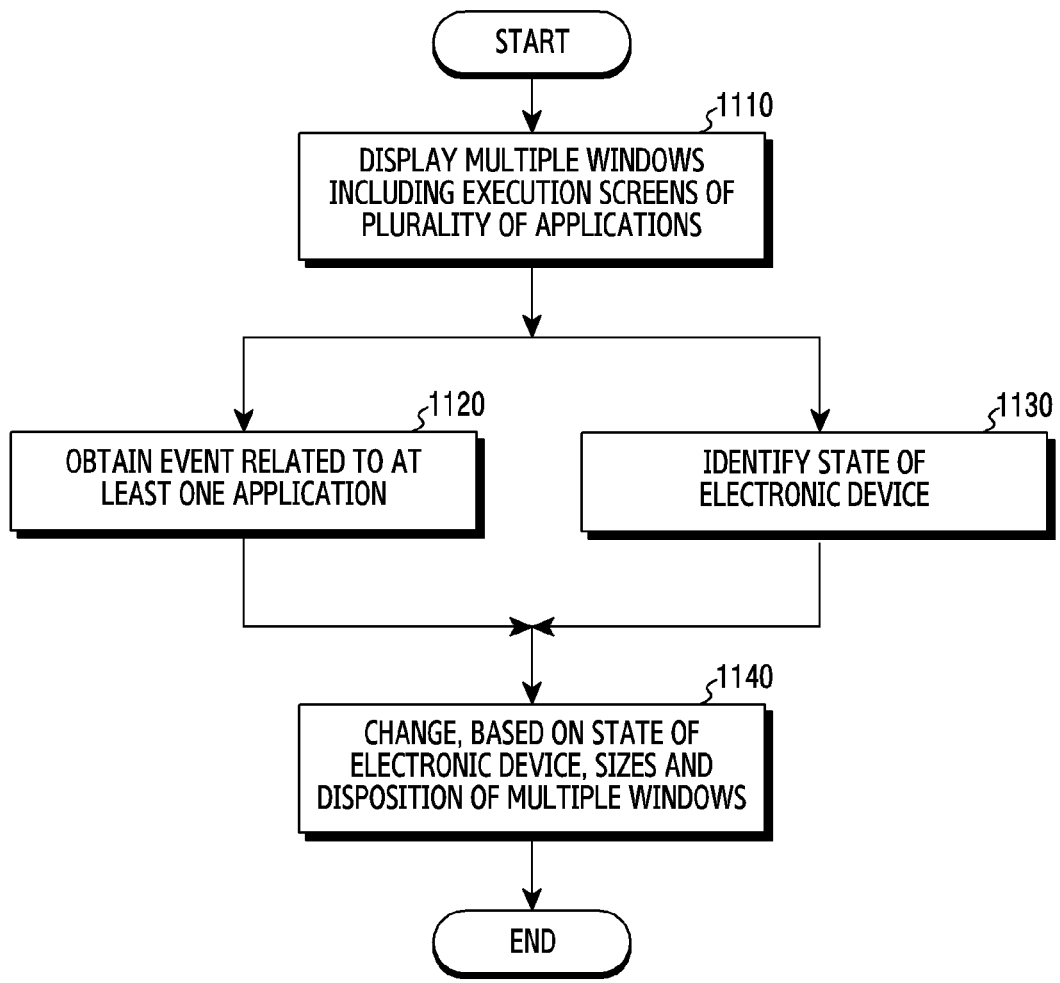
FIG. 10 is a flowchart illustrating controlling a multi-window disposition of an electronic device, according to an embodiment.

FIG. 10 is a flowchart illustrating controlling of a multi-window disposition of an electronic device, according to an embodiment. In the embodiments hereinafter, operations may be performed sequentially, but it is not necessarily limited thereto. For example, the order of operations may be changed, and/or at least two operations may be performed in parallel.

Referring to FIG. 10, the processor 210 according to an embodiment may display multiple windows including execution screens of a plurality of applications in operation 1110. According to an embodiment, the processor 210 may determine a window having the largest size among a plurality of windows as a main window, and may determine the remaining windows as sub-windows.

According to an embodiment, the processor 210 may obtain an event related to at least one application in operation 1120. According to an embodiment, the processor 210 may obtain an event related to an application of which an execution screen is displayed in a sub-window. For example, an event may include reception of a text message, reception of a phone call, reception of an e-mail, reception of a messenger message, reception of a notification from an SNS application, notifications from various applications, and the like.

According to an embodiment, the processor 210 may identify the state of an electronic device in operation 1130. According to an embodiment, the processor 210 may detect a change in the state of an electronic device (e.g., the electronic device 100 of FIG. 9A and FIG. 9B) by using at least one sensor. Although at least one sensor according to an embodiment may include at least one of a hall sensor and a distance sensor, it is not limited thereto. According to an embodiment, the processor 210 may identify the state of an electronic device based on the size of a display area exposed to the outside.

According to an embodiment, in operation 1140, the processor 210 may change a window that displays an execution screen of the application in which the event occurs. According to an embodiment, in response to obtaining the event related to the application of which the execution screen is displayed in the sub-window, the processor 210 may change the locations of the sub-windows and the main window.

According to an embodiment, the processor 210 may change the size and/or disposition of multiple windows based on the identified state of the electronic device. For example, the processor 210 may enlarge or diminish the size of a window in a predetermined ratio to correspond to the size of a display area exposed to the outside.

Figure 11:
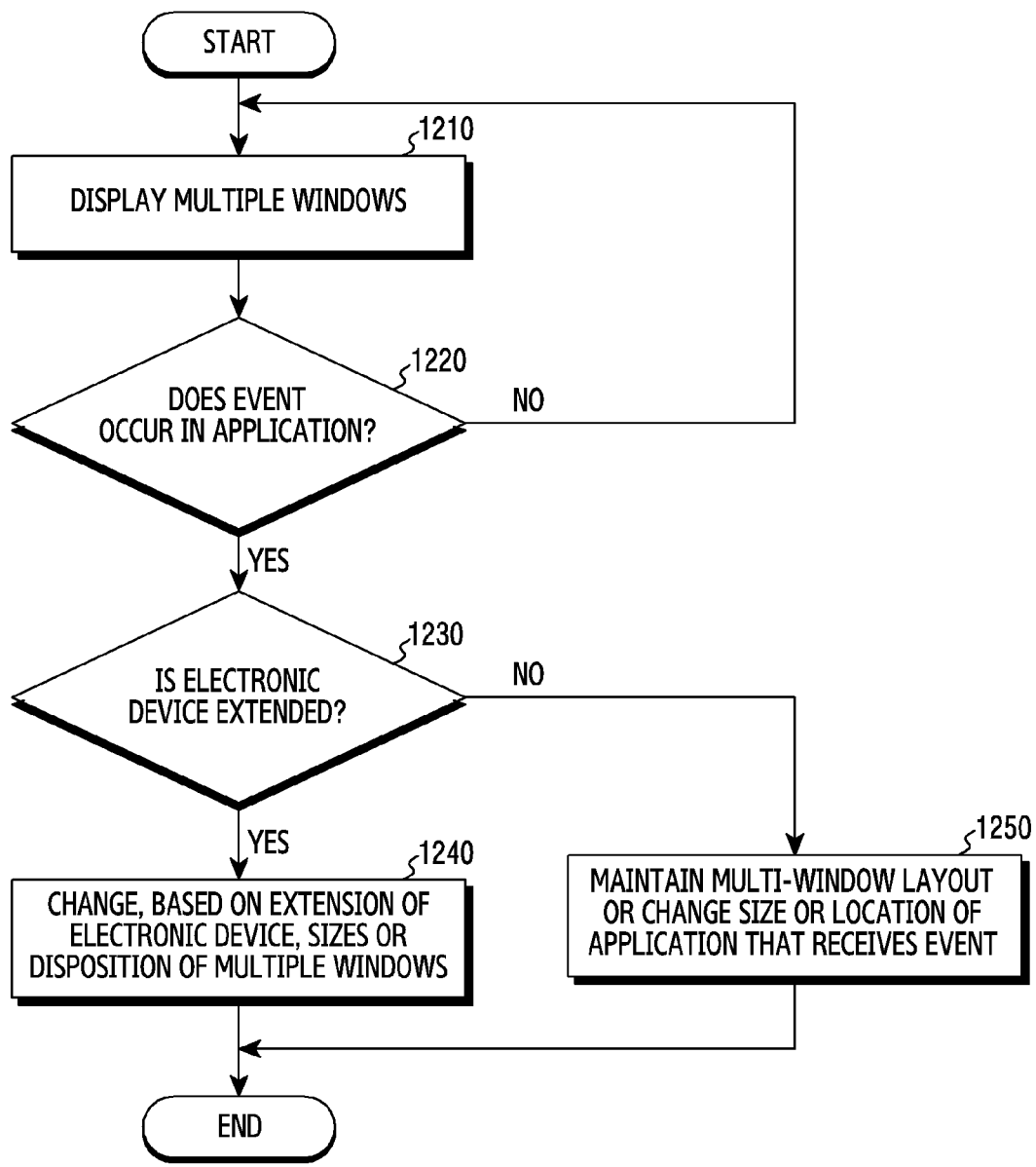
FIG. 11 is a flowchart illustrating controlling a multi-window disposition based on identifying of a state of an electronic device, in the electronic device, according to an embodiment.

FIG. 11 is a flowchart illustrating controlling of a multi-window disposition based on identifying of a state of an electronic device, in the electronic device according to an embodiment.

Referring to FIG. 11, the processor 210 according to an embodiment may display multiple windows including execution screens of a plurality of applications in operation 1210. According to an embodiment, the processor 210 may determine a window having the largest size among a plurality of windows as a main window, and may determine the remaining windows as sub-windows.

According to an embodiment, the processor 210 may determine whether an event related to at least one application occurs in operation 1220. For example, an event may include reception of a text message, reception of a phone call, reception of an e-mail, reception of a messenger message, reception of a notification from an SNS application, notifications from various applications, and the like.

According to an embodiment, in case that an event related to at least one application is determined as not being present in operation 1220, the processor 210 may perform again operation 1210 and operations subsequent thereto.

According to an embodiment, in case that an event related to at least one application is determined as being present in operation 1220, the processor 210 may determine whether the electronic device is being extended in operation 1230. For example, the processor 210 may detect a movement of the second housing 112 with respect to the first housing 111.

According to an embodiment, in case that the electronic device is determined as being extended in operation 1230, the processor 210 may change, as a main window, a window of a screen in which an application that receives an event is executed, and may reconfigure a multi-window layout in operation 1240.

According to an embodiment, in case that the electronic device is determined as not being extended in operation 1230, the processor 210 may maintain an existing multi-window layout in operation 1250. According to another embodiment, in case that the electronic device is determined as not being extended, the processor 210 may change the size or location of a screen in which an application that receives an event is executed.

Figure 12:
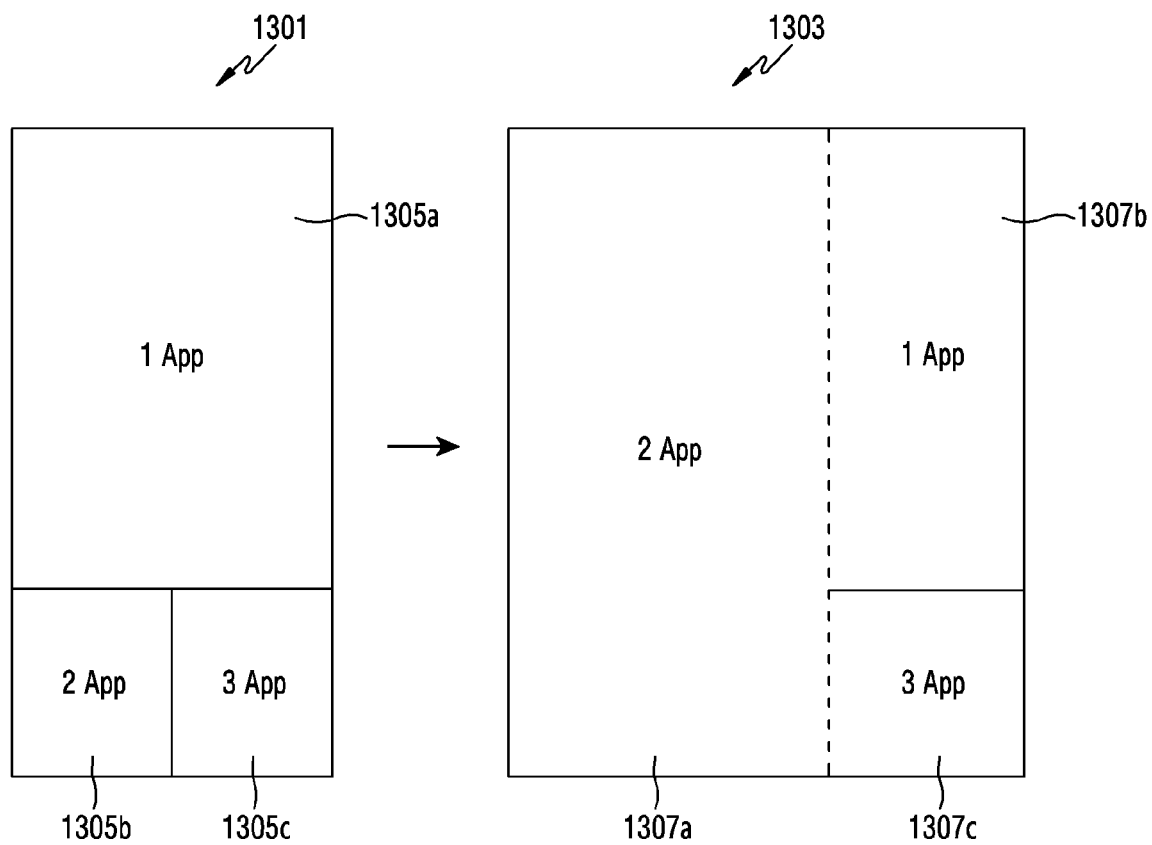
FIG. 12 is a diagram illustrating that a window disposition is changed as the state of an electronic device is changed in the electronic device, according to an embodiment.

FIG. 12 is a diagram illustrating that a window disposition is changed as the state of an electronic device is changed in the electronic device according to an embodiment.

Referring to FIG. 12, an electronic device in a first state 1301 (e.g., a diminished state) according to an embodiment may display execution screens of a plurality of applications together in a plurality of areas in a display screen. For example, an execution screen of a first application, an execution screen of a second application, and an execution screen of a third application may be displayed in a first window 1305a, a second window 1305b, and a third window 1305c, respectively.

According to an embodiment, an electronic device in a second state 1303 (e.g., an extended state) may change the size and/or location of a window based on an extended state of the electronic device. For example, in case that an event related to the second application occurs, the processor 210 may display the second application in a main window 1307a having the largest size. According to an embodiment, the processor 210 may display the first application and the third application in which events do not occur in sub-windows 1307b and 1307c. According to an embodiment, the sub-windows 1307b and 1307c may be included in an extended area.

Figure 13:
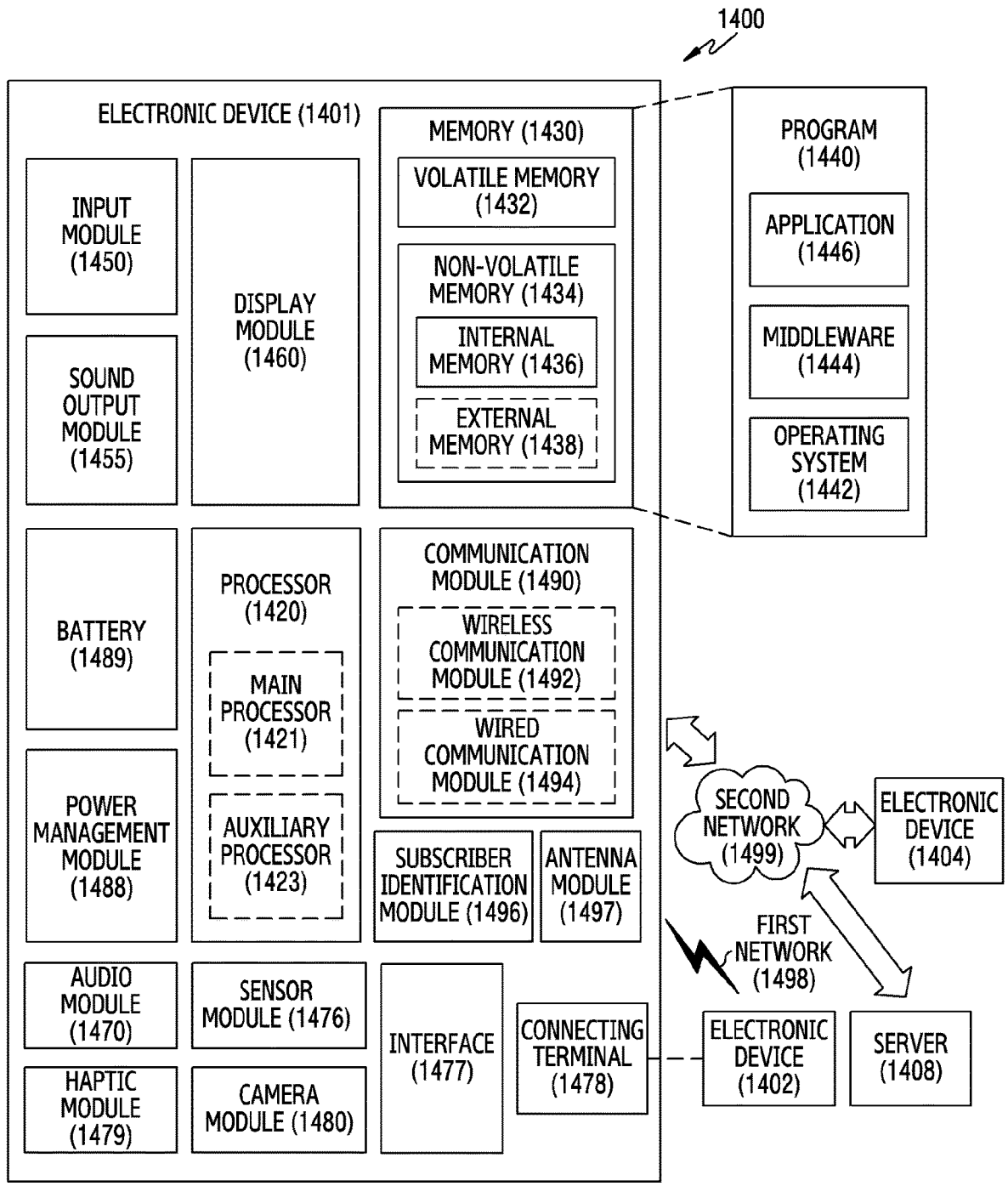
FIG. 13 is a block diagram illustrating an electronic device in a network environment, according to an embodiment.

FIG. 13 is a block diagram illustrating an electronic device 1401 in a network environment 1400 according to various embodiments.

Referring to FIG. 13, the electronic device 1401 in the network environment 1400 may communicate with an electronic device 1402 via a first network 1498 (e.g., a short-range wireless communication network), or at least one of an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In some embodiments, at least one of the components (e.g., the connecting terminal 1478) may be omitted from the electronic device 1401, or one or more other components may be added in the electronic device 1401. In some embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423. According to an embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thererto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing audio. The receiver may be used for receiving incoming calls. According to an embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In another embodiment, the external electronic device 1404 may include an internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, an electronic device (e.g., the electronic device 1401 of FIG. 14) according to an embodiment may include a display (e.g., the display 230 of FIG. 2) and at least one processor operatively connected to the display, and the at least one processor is configured to display multiple windows including a plurality of execution screens respectively corresponding to a plurality of applications in the display, wherein a first execution screen corresponding to a first application among the plurality of applications is displayed in a first window provided in a first size, and a second execution screen corresponding to a second application among the plurality of applications is displayed in a second window provided in a second size smaller than the first size, to obtain an event related to the second application, and to change the window that displays the second execution screen of the second application or display a UI related to a multi-window disposition in the second window, in response to obtaining the event related to the second application.

According to an embodiment, the at least one processor may change the window that displays the second execution screen of the second application from the second window to the first window.

According to an embodiment, the at least one processor may display the first execution screen of the first application in the second window.

According to an embodiment, the at least one processor may automatically change the window that displays the second execution screen of the second application.

According to an embodiment, based on user input to the UI related to a multi-window disposition, the at least one processor may change the window that displays the second execution screen of the second application from the second window to another window.

According to an embodiment, the at least one processor may change windows that display execution screens of the applications based on designated priorities of the applications in case of obtaining a plurality of events related to the applications.

According to an embodiment, the electronic device may further include a speaker, and the at least one processor may control the speaker, which has been used for the first application, for the second application in response to obtaining the event related to the second application.

According to an embodiment, the electronic device may further include a microphone, and the at least one processor may control the microphone for the second application in case of obtaining the event related to the second application.

According to an embodiment, the electronic device may further include a camera, and the at least one processor may control the camera for the second application in case of obtaining the event related to the second application.

According to an embodiment, based on user input to the second window that displays the first execution screen, the at least one processor may enable the windows that display the first execution screen and the second execution screen to revert to windows used before window change.

As described above, an operation method of an electronic device (e.g., the electronic device 1401 of FIG. 14) according to an embodiment may include displaying, in a display (e.g., the display 230 of FIG. 2), multiple windows including a plurality of execution screens respectively corresponding to a plurality of applications, wherein a first execution screen corresponding to a first application among the plurality of applications is displayed in a first window provided in a first size, and a second execution screen corresponding to a second application among the plurality of applications is displayed in a second window provided in a second size smaller than the first size, obtaining an event related to the second application, and changing the window that displays the second execution screen of the second application, or displaying a UI related to a multi-window disposition in the second window, in response to obtaining of the event related to the second application.

According to an embodiment, the method may include changing the window that displays the second execution screen of the second application from the second window to the first window.

According to an embodiment, the method may include displaying the first execution screen of the first application in the second window.

According to an embodiment, the method may include automatically changing the window that displays the second execution screen of the second application in case obtaining the event related to the second application.

According to an embodiment, the method may include changing, based on user input to the UI related to a multi-window disposition, the window that displays the second execution screen of the second application from the second window to another window.

As described above, an electronic device (e.g., the electronic device 100 of FIG. 9A and FIG. 9B) according to an embodiment may include a display (e.g., the display 230 of FIG. 2) that displays a screen on at least a part of a display area, a sensor configured to detect that the display area is enlarged or diminished, and at least one processor operatively connected to the display, and the at least one processor may display multiple windows including a plurality of execution screens respectively corresponding to a plurality of applications in the display, wherein a first execution screen corresponding to a first application among the plurality of applications is displayed in a first window provided in a first size, and a second execution screen corresponding to a second application among the plurality of applications is displayed in a second window provided in a second size smaller than the first size, may obtain an event related to the second application, may identify a state of the electronic device via the sensor, and may change, based on the state of the electronic device, sizes and a disposition of multiple window in response to obtaining of the event related to the second application and identifying of the state of the electronic device.

According to an embodiment, the at least one processor may change the sizes and the disposition of the multiple windows based on a predetermined ratio.

According to an embodiment, the at least one processor may change the window that displays an execution screen of the second application to be larger than the window that displays an execution screen of the first application.

According to an embodiment, the at least one processor may automatically change the sizes and the disposition of the multiple windows.

According to an embodiment, the at least one processor may display a UI related to a multi-window disposition on an execution screen of the second application.

According to an embodiment, the at least one processor may change the multi-window disposition based on user input to the UI related to the multi-window disposition.

According to an embodiment, the electronic device may further include a speaker, and the at least one processor may control the speaker, which has been used for the first application, for the second application in response to obtaining the event related to the second application.

According to an embodiment, the electronic device may further include a microphone, and the at least one processor may control the microphone for the second application in response to obtaining the event related to the second application.

According to an embodiment, the electronic device may further include a camera, and the at least one processor may control the camera for the second application in response to obtaining the event related to the second application.

According to an embodiment, the electronic device may be one of a slidable display electronic device, a rollable display electronic device, and a foldable display electronic device.

What is claimed is:
1. An electronic device comprising:
   a display;
   a slidable housing configured to extend the display such that the display on a side is a size that is smaller based on the slidable housing being in a first state as compared to the size of the display based on the slidable housing being in a second state;
   memory storing instructions; and
   at least one processor, wherein the instructions, when executed by the at least one processor, cause the electronic device to:
control the display to display a multi-window including a plurality of windows displaying a plurality of execution screens corresponding to a plurality of applications, wherein a first execution screen corresponding to a first application among the plurality of applications is displayed in a first window having a first size, and a second execution screen corresponding to a second application among the plurality of applications is displayed in a second window having a second size that is smaller than the first size;
obtain an event related to the second application, wherein the event comprises at least one of a reception of a text message, a reception of a phone call, a reception of an e-mail, a reception of a messenger message, or a reception of a notification from a social networking service (SNS) application; and
based on obtaining the event related to the second application:
identify whether a state of the slidable housing is changing from the first state to the second state; and
in response to identifying the state of the slidable housing is changing from the first state to the second state:
while the state of the slidable housing is changing from the first state to the second state, change a layout of the multi-window, and
based on the changed layout of the multi-window, display the second execution screen of the second application on a window larger than other windows of the multi-window; and
in response to identifying the state of the slidable housing is maintained, change the window that displays the second execution screen of the second application from the second window to the first window.

2. The electronic device of claim 1, wherein the instructions, when executed by the at least one processor, cause the electronic device to, based on obtaining the event related to the second application and the state of the slidable housing being maintained, control the display to display the first execution screen of the first application in the second window.

3. The electronic device of claim 2, wherein the instructions, when executed by the at least one processor, cause the electronic device to, based on a user input to the second window that displays the first execution screen and the state of the slidable housing being maintained, control the display to revert the windows that display the first execution screen and the second execution screen to windows used before window change.

4. The electronic device of claim 1, wherein the instructions, when executed by the at least one processor, cause the electronic device to:
based on obtaining the event related to the second application, display a user interface (UI) receiving a user input for changing a disposition of the multi-window; and
in response the user input to the UI for changing the disposition of the multi-window, control the display to change the window that displays the second execution screen of the second application from the second window to another window.

5. The electronic device of claim 1, wherein the instructions, when executed by the at least one processor, cause the electronic device to, based on obtaining a plurality of events related to the plurality of applications, control the display to change windows that display execution screens of the plurality of applications based on designated priorities of the plurality of applications.

6. The electronic device of claim 1, further comprising a speaker,
wherein the instructions, when executed by the at least one processor, cause the electronic device to, based on obtaining the event related to the second application, control the speaker, which has been used for the first application, for use with the second application.

7. The electronic device of claim 1, further comprising a microphone,
wherein the instructions, when executed by the at least one processor, cause the electronic device to, based on obtaining the event related to the second application, control the microphone for use with the second application.

8. The electronic device of claim 1, further comprising a camera,
wherein the instructions, when executed by the at least one processor, cause the electronic device to, based on obtaining the event related to the second application, control the camera for use with the second application.

9. An operation method of an electronic device, the operation method comprising:
displaying, in a display of the electronic device, a multi-window including a plurality of windows displaying a plurality of execution screens corresponding to a plurality of applications, wherein a first execution screen corresponding to a first application among the plurality of applications is displayed in a first window having a first size, and a second execution screen corresponding to a second application among the plurality of applications is displayed in a second window having a second size that is smaller than the first size;
identifying whether a state of a slidable housing of the electronic device is changing from a first state to a second state, the first state being the state in which the display on a side is a size that is smaller as compared to the size of the display based on the slidable housing being in the second state;
obtaining an event related to the second application, wherein the event comprises at least one of a reception of a text message, a reception of a phone call, a reception of an e-mail, a reception of a messenger message, or a reception of a notification from a social networking service (SNS) application;
based on obtaining the event related to the second application:
identifying whether a state of the slidable housing is changing from the first state to the second state; and
in response to identifying the state of the slidable housing is changing from the first state to the second state:
while the state of the slidable housing is changing from the first state to the second state, changing a layout of the multi-window, and
based on the changed layout of the multi-window, displaying the second execution screen of the second application on a window larger than other windows of the multi-window;
in response to identifying the state of the slidable housing is maintained, changing the window that displays the second execution screen of the second application from the second window to the first window.

10. The operation method of claim 9, further comprising, based on the obtaining the event related to the second application and the state of the slidable housing being maintained, displaying the first execution screen of the first application in the second window.

11. The operation method of claim 9, further comprising:
based on obtaining the event related to the second application, displaying a user interface (UI) receiving a user input for changing a disposition of the multi-window; and
changing, based on the user input to the UI for changing the disposition of the multi-window, the window that displays the second execution screen of the second application from the second window to another window.

* * * * *